US012478653B2

(12) United States Patent
    Nam

(10) Patent No.: US 12,478,653 B2
(45) Date of Patent: Nov. 25, 2025

(54) COMPOSITION FOR PREVENTION, ALLEVIATION, OR TREATMENT OF ATOPIC DERMATITIS DISEASE

(71) Applicant: Jong Hyun Nam, Seoul (KR)

(72) Inventor: Jong Hyun Nam, Seoul (KR)

( * ) Notice: Subject to any disclaimer, the term of this patent is extended or adjusted under 35 U.S.C. 154(b) by 795 days.

(21) Appl. No.: 17/747,347

(22) Filed: May 18, 2022

(65) Prior Publication Data

US 2022/0273746 A1     Sep. 1, 2022

Related U.S. Application Data

(63) Continuation of application No. PCT/KR2021/002796, filed on Mar. 8, 2021.

(30) Foreign Application Priority Data

May 20, 2020  (KR) .......................... 10-2020-0060273

(51) Int. Cl.
| | | |
|---|---|---|
| *A61K 36/282* | (2006.01) | |
| *A61K 36/28* | (2006.01) | |
| *A61K 36/31* | (2006.01) | |
| *A61K 45/06* | (2006.01) | |
| *A61P 17/00* | (2006.01) | |
| *A61K 36/725* | (2006.01) | |
| *A61K 36/815* | (2006.01) | |

(52) U.S. Cl.
CPC ............ *A61K 36/282* (2013.01); *A61K 36/28* (2013.01); *A61K 36/31* (2013.01); *A61K 45/06* (2013.01); *A61P 17/00* (2018.01); *A61K 36/725* (2013.01); *A61K 36/815* (2013.01)

(58) Field of Classification Search
None
See application file for complete search history.

(56) References Cited

U.S. PATENT DOCUMENTS

| 9,295,704 | B2 | 3/2016 | Ma et al. |
| 9,694,045 | B2 | 7/2017 | Lee et al. |
| 2013/0224181 | A1 | 8/2013 | Ma et al. |
| 2014/0010899 | A1 | 1/2014 | Lee et al. |
| 2016/0256421 | A1 | 9/2016 | Oh et al. |

FOREIGN PATENT DOCUMENTS

| CN | 103228287 A | 7/2013 |
| CN | 103327992 A | 9/2013 |
| CN | 105682652 A | 6/2016 |
| EP | 0 311 963 A1 | 4/1989 |
| JP | 2000-239161 A | 9/2000 |
| JP | 2006-143659 A | 6/2006 |
| KR | 10-2007-0121333 A | 12/2007 |
| KR | 10-2010-0046605 A | 5/2010 |
| KR | 10-2015-0097336 A | 8/2015 |
| KR | 20070121333 A * | 12/2017 |
| KR | 10-1874462 B1 | 7/2018 |

OTHER PUBLICATIONS

Delgado-Rodriquez, F.V., et al., Ethnobotany, Pharmacology and Major Bioactive Metabolites from *Impatiens* Genus Plants and their Related Applications, Pharmacognosy Reviews, 2023; 17(34):338-381.*
Lee, S.J., et al., Study of anti-atopic dermatitis effects of juice of Raphanus sativus var in HaCaT cell line, article: Korean Society for Biotechnology and Bioengineering Journal, 2017, vol. 32, No. 4, 311-318 ref. 18 (Year: 2017).*
Hameed, M.F., et al., Effect of Topical Flavonoid Fraction from Artemisia annua in Comparison with Tacrolimus on Induced Atopic Dermatitis in Mice, Iraqi JMS, 2019; 17(3&4): 231-237 (Year: 2019).*
Yiyue et al., "Research on the Anti-allergic Effect of Impatiens (15): The Effect of Naphthoquinone Acids on Pruritus and Atopic Dermatitis [JJ]", Foreign Medicine (Traditional Chinese Medicine Volume), p. 250, vol. 24, No. 4, Dec. 2002, with a partial English translation.
Weiping Yang, "Artemisia annua, common Chinese herbal medicine map and formula 3", Guizhou Science and Technology Press, p. 15, Sep. 2012, with a partial English translation.
First Notification of Office Action issued for Chinese Patent Application No. 202180006463.7, dated Dec. 7, 2022, with an English translation.
Lee et al., "Effects of Herbal Complex on Atopic Dermatitis in BALB/c Mice", Kor. J. Pharmacogn., 2012, pp. 59-65, vol. 43, No. 1., with English abstract.
Imokawa et al., "Decreased level of ceramides in stratum corneum of atopic dermatitis: an etiologic factor in atopic dry skin?", English Abstract, J Invest Dermatol, Apr. 1991, vol. 96, No. 4.
Heijden et al., "High frequency of IL-4-producing CD4+ allergen-specific T lymphocytes in atopic dermatitis lesional skin", English Abstract, J Invest Dermatol, Sep. 1991, vol. 97, No. 3.
Imai et al., "Selective recruitment of CCR4-bearing Th2 cells toward antigen-presenting cells by the CC chemokines thymus and activation-regulated chemokine and macrophage-derived chemokine", International Immunology, 1999, Japanese Society for Immunology, pp. 81-88, vol. 11, No. 1.
Hussain et al., "CpG oligodeoxynucleotides: a novel therapeutic approach for atopic disorders", English Abstract, Review, Curr Drug Targets Inflamm Allergy, Sep. 2003, pp. 199-205, vol. 2, No. 3.
Giustizieri et al., "Keratinocytes from patients with atopic dermatitis and psoriasis show a distinct chemokine production profile in reponse to T cell-derived cytokines", J Allergy Clin Immunol, May 2001, pp. 871-877, vol. 107, No. 5.
Yoshie et al., "Chemokines in immunity", English Abstract, Review, Adv Immunol, 2001, vol. 78, No. 57.
Horikawa et al., "IFN-γ-inducible expression of thymus and activation-regulated chemokine/CCL17 and macrophage-derived chemokine/CCL22 in epidermal keratinocytes and their roles in atopic dermatitis", International Immunology, 2002, The Japanese Society for Immunology, pp. 767-773, vol. 14, No. 7.

(Continued)

*Primary Examiner* — H. Sarah Park
(74) *Attorney, Agent, or Firm* — Myers Wolin, LLC

(57) ABSTRACT

There is provided a composition for prevention, alleviation, or treatment of atopic dermatitis diseases, a functional food and a pharmaceutical composition, each including same, and a composition for alleviation of atopic dermatitis diseases, including an *Impatiens arguta* extract as an active ingredient.

11 Claims, No Drawings

(56) References Cited

OTHER PUBLICATIONS

Nakazato et al., "Serum levels of Th2 chemokines, CCL17, CCL22, and CCL 27, were the important markers of severity in infantile atopic dermatitis", English Abstract, Pediatric Allergy and Immunology, Oct. 2008, pp. 605-613, vol. 19, No. 7.

Hijnen, MD, et al., "Serum thymus and activation-regulated chemokine (TARC) and cutaneous T cell-attracting chemokine (CTACK) levels in allergic diseases: TARC and CTACK are disease-specific markers for atopic dermatitis", Science Direct, Journal of Allergy and Clinical Immunology, Feb. 2004, pp. 334-340, vol. 113, No. 2.

Shimada et al., "Both Th2 and Th1 chemokines (TARC/CCL17, MDC/CCL22, and Mig/CXCL9) are elevated in sera from patients with atopic dermatitis", English Abstract, Science Direct, Journal of Dermatological Science, May 2004, op. 201-208, vol. 34, No. 3.

Arellano et al., "Risk of lymphoma following exposure to calcineurin inhibitors and topical steroids in patients with atopic dermatitis", English Abstract, J Invest Dermatol, Apr. 2007, vol. 127, No. 4.

Oku et al., "Antipruritic and Antidermatitic Effect of Extract and Compounds of *Impatiens balsamina* L. in Atopic Dermatitis Model NC Mice", Phytotherapy Research, 2001, pp. 506-510, vol. 15, John Wiley and Sons, Inc., United States.

International Search Report issued by the Korean Intellectual Property Office for corresponding International Patent Application No. PCT/KR2021/002796, mailed on Jun. 14, 2021, with an English translation.

The extended European search report with the Supplementary European search report and the European search opinion, issued by the European Patent Office for corresponding European Patent Application No. 21807638.8, mailed on May 15, 2024.

Delgado-Rodriguez et al., "Ethnobotany, Pharmacology and Major Bioactive Metabolites from *Impatiens* Genus Plants and their Related Applications", Pharmacognosy Reviews, 2023, pp. 338-381, vol. 17, No. 34.

\* cited by examiner

COMPOSITION FOR PREVENTION, ALLEVIATION, OR TREATMENT OF ATOPIC DERMATITIS DISEASE

CROSS-REFERENCE TO RELATED APPLICATION

This application is a continuation application of International Application PCT/KR2021/002796 filed on Mar. 8, 2021 and designated the U.S., which claims priority to Korean Patent Application No. 10-2020-0060273, filed on May 20, 2020. The contents of each are herein incorporated by reference.

TECHNICAL FIELD

The present invention relates to a composition for prevention, alleviation, or treatment of atopic dermatitis diseases and to a functional food and a pharmaceutical composition, each comprising same.

BACKGROUND ART

Atopic dermatitis is a recurrent chronic skin disease, which occurs frequently from infancy to infancy, but may persist into adulthood or may develop newly in adulthood, and its prevalence is increasing recently (Kor J Pharmacogn., 43:59-65, 2012). Atopic dermatitis is characterized by symptoms such as pruritus, dry skin, hyperfollicular hypertrophy, cheilitis, lichenification, and eczema-like lesions (Korean J Invest Dermatol., 14:67-72, 2007).

The cause of atopic dermatitis is not yet clearly defined, but an abnormal increase in IgE, a decrease in the number and function of T cells that play a central role in cellular immunity, infiltration of monocytes and macrophages, an increase in the number of mast cells and eosinophils, immunological factors such as an increase in the number of CD4+ T lymphocytes have been reported (J Invest Dermatol., 96:523-526, 1991; J Invest Dermatol., 97:389-394, 1991; Immunol., 11:81-88, 1999; Curr Drug Targets Inflamm Allergy., 2:199-120, 2003; J Allergy Clin Immunol., 107: 871-877, 2001; Adv Immunol., 78:57, 2001; International Immunology, 14(7):767-773, 2002; Pediatr Allergy Immunol., 19:605-613, 2008), and in particular, it is known that Th1/Th2 imbalance due to an increase in the number of Th2 cells compared to Th1 cells is an important factor (Kor J Pharmacogn, 43:59-65, 2012).

Recently, it has been reported that serum concentrations of TARC and MDC significantly increase in patients with atopic dermatitis (J Allergy Clin Immunol., 113(2):334-340), there is a report that the skin expression of TARC and MDC is increased in atopic dermatitis animal model, and there is another report that the serum concentrations of MDC and TARC decrease when cyclosporin A or corticosteroids, which are used as therapeutic substances for atopic dermatitis, are administered to patients with atopic dermatitis. (J Dermatol Sci., 34:201-208, 2004). In addition, when HaCaT cells as human keratinocyte cell line, were treated with INF-γ or TNF-α in an in vitro experiment, a large amount of MDC and TARC were expressed, and it has been suggested that a substance capable of inhibiting such expression can be used as a therapeutic agent for atopic dermatitis (Int Immunol., 14(7):767-773, 2002).

Currently, steroids that suppress the inflammatory response and cytokine production are mainly used as a treatment for atopic dermatitis, long-term administration of steroids may cause various side effects, such as skin atrophy or growth retardation. Thus, the use of non-steroids is increasing recently. However, nonsteroidal drugs also have various side effects, such as symptoms such as erythema, itchiness, edema, erosion and lichenification, and weakening of immunity, making it difficult to treat fundamental atopic dermatitis. (Arellano F M et al., J Invest Dermatol. 2007 April; 127(4):808-16). Accordingly, there is a need for research to find substances with excellent therapeutic effects from natural products with relatively high safety.

DESCRIPTION OF EMBODIMENTS

Technical Problem

An objective of the present invention is to provide a composition which has no side effects and no objection to ingestion and thus can be easily prevented before the onset of a disease, and can alleviate or treat the disease due to continuous ingestion even after the onset.

Another objective of the present invention is to provide a health functional food which can be easily ingested and thus can be easily ingested by anyone, regardless of age or sex, can be conveniently used in daily life and thus can be easily prevented before the onset of a disease, and can alleviate or treat the disease due to continuous ingestion even after the onset.

Still another objective of the present invention is to provide a pharmaceutical composition which has no side effects and no objection to ingestion and thus can be easily prevented before the onset of a disease, and can alleviate or treat the disease due to continuous ingestion even after the onset.

Solution to Problem

In order to achieve an objective of the present invention, provided is a composition for alleviation of atopic dermatitis diseases, comprising an *Impatiens arguta* extract as an active ingredient.

According to an embodiment, the extract is preferably an extract by water, ethanol, or a mixed solvent thereof.

According to an embodiment, the composition preferably further comprises an *Artemisia annua* extract.

According to an embodiment, the *Impatiens arguta* extract is preferably a first raw material, and the composition preferably further comprises at least one of selected from the group consisting of *Raphanus sativus* extract, *Pyrus pyrifolia* extract and *Artemisia annua* extract as a second raw material.

According to an embodiment, the extracts of the first raw material and the second raw material are preferably mixed in a weight ratio of 1:0.2 to 1.5.

According to an embodiment, the composition preferably further comprises an extract of at least one of *Ziziphus jujuba, Schisandrae chinensis, Lycium chinense, Alnus japonica, Cuscuta semen*, and *Rhodiola rosea*.

According to an embodiment, the composition preferably further comprises honey.

In order to achieve another objective of the present invention, provided is a health functional food for prevention or alleviation of atopic dermatitis diseases, comprising the composition according to the present invention.

According to an embodiment, the health functional food is a natural tea composition.

In order to achieve still another objective of the present invention, provided is a pharmaceutical composition for prevention, alleviation, or treatment of atopic dermatitis diseases, comprising the composition according to the present invention.

In order to achieve still another objective of the present invention, provided is a cosmetic composition for prevention or alleviation of atopic dermatitis diseases, comprising the composition according to the present invention.

Advantageous Effects of Disclosure

Therefore, the composition of the present invention can significantly inhibit the proliferation of bronchial smooth muscle cells in atopic dermatitis patients, and thus can be effectively used as a composition for preventing, alleviating or treating atopic dermatitis disease.

In addition, the composition of the present invention, which uses natural substances, has no side effects, and is easy to drink, and thus can be consumed continuously in daily life, like drinking water, thereby preventing atopic dermatitis diseases.

Best Mode

Hereinafter, the present invention will be described in more detail.

The present invention relates to a composition for alleviation of atopic dermatitis diseases, comprising an *Impatiens arguta* extract as an active ingredient.

*Impatiens arguta*, which is a species belonging to the family Balsaminaceae, is a herbaceous perennial distributed in India, Malaysia, and China, and stems, leaves, seeds and flowers thereof can be utilized.

As used herein, the term "extract" refers to: an extract obtained by leaching the stems, leaves, fruits, flowers, and roots of a plant to be extracted, or a mixture thereof, by using water, lower alcohols having 1 to 4 carbon atoms (methanol, ethanol, butanol, etc.), methylene chloride, ethylene, acetone, hexane, ether, chloroform, ethyl acetate, butyl acetate, N,N-dimethylformamide (DMF), methyl sulfoxide (DMSO), 1,3-butylene glycol, propylene glycol, or a mixed solvent thereof; an extract obtained by using a supercritical extraction solvent, such as carbon dioxide, pentane, etc.; or a fraction obtained by fractionating the extract, and, in respect to the extraction method, any method, such as chilling, reflux, warming, ultrasonic radiation, or supercritical extraction, may be applied in consideration of the polarity of the active material, the degree of extraction, and the degree of preservation. The fractionated extract is meant to include a fraction obtained by suspending an extract in a specific solvent and then mixing with a solvent having a different polarity to then be allowed to stand, and a fraction obtained by adsorbing the crude extract to a column filled with silica gel, etc., and using a hydrophobic solvent, a hydrophilic solvent, or a mixed solvent thereof as a mobile phase. In addition, the extract is meant to include a concentrated liquid extract or solid extract from which the extraction solvent has been removed by a method, such as freeze drying, vacuum drying, hot air drying, spray drying, etc. The extract preferably refers to an extract obtained by using water, ethanol, or a mixed solvent thereof as an extraction solvent, and more preferably an extract obtained by using a mixed solvent of water and ethanol as an extraction solvent.

In addition, as used herein, the term "active ingredient" refers to a component that can exhibit a desired activity alone or can exhibit activity together with a carrier that is not active by itself.

Also, in the present specification, "atopic dermatitis" is defined as including all diseases classified as atopic dermatitis in the art due to an overactive immune reaction regardless of the direct or indirect cause of its occurrence. In general, atopic dermatitis is classified into infant type atopic dermatitis, juvenile type atopic dermatitis, adult type atopic dermatitis, and maternal type atopic dermatitis according to the onset time or subject of the invention. In the present specification, atopic dermatitis includes all types of atopic dermatitis.

Also in this specification, "alleviation" is meant to include treatment, prevention and improvement (relief of symptoms) of atopic dermatitis.

The composition of the present invention may contain the active ingredient in any amount (effective amount) as long as it can exhibit the atopic dermatitis alleviating activity intended for treatment, depending on the use, formulation, purpose of mixing, etc., and a typical effective amount may be determined within the range of 0.001 wt % to 15 wt % on the basis of the total weight of the composition. As used herein, the term "effective amount" refers to the amount of the active ingredient included in the composition of the present invention, in which intended functional and pharmacological effects, such as atopic dermatitis alleviating effect, etc. can be exhibited. Such an effective amount may be empirically determined within the ordinary ability of a person skilled in the art.

The composition of the present invention may further include, in addition to the active ingredient, any compounds or natural extracts that have already been tested for safety in the art and known to have corresponding activities, for the enhancement and reinforcement of an atopic dermatitis alleviation effect, or the enhancement of the convenience of taking or ingestion through the addition of similar activities such as skin protection activity (suppression of skin damage caused by UV rays, skin moisturizing, etc.).

Such compounds or extracts may include compounds or extracts listed in the compendium, such as a national pharmacopoeia of each country ("Korean Pharmacopoeia" in Korea), compounds or extracts that have been approved for items in accordance with the laws of each country governing the manufacture and sale of pharmaceuticals (the "Pharmaceutical Law" in Korea), and compounds or extracts, functionality of which are recognized in accordance with the laws of each country that regulate the manufacture and sale of health functional foods (the "Health Functional Food Act" in Korea). Examples of such compounds or extracts may include Enterococcus faecalis heat-treated dried powder, which has been individually recognized for its functionality as "relief of hypersensitive immune response" according to the Health Functional Food Act of Korea, a compound such as a guava leaf extract, Actinidia arguta extract, Perillae folium extract, or picaopreto powder, PLAG (1-palmitoyl-2-linoleoyl-3-acetyl-rac-glycerol), *L. sakei* Probio 65, which has been individually recognized for its functionality as "improving sensitive skin condition", oils containing gamma-linolenic acid, *L. plantarum* CJLP133 as a lactic acid bacterium derived from fruits and vegetables, probiotics ATP, etc.

One or more of these compounds or natural extracts may be included in the composition of the present invention together with the active ingredient.

In a specific aspect, the composition of the present invention can be identified as a food composition. When the composition of the present invention is identified as a food composition, the use thereof may be understood to inhibit a skin hypersensitivity reaction.

The food composition of the present invention may be prepared in any form including, for example: beverages, such as tea, juice, carbonated beverages, or ion beverages; processed milks, such as milk and yogurt, gums; foods, such as rice cakes, Korean sweets, bread, confectionery, or noodles; or health functional food preparations, such as tablets, capsules, pills, granules, liquids, powders, flakes, pastes, syrups, gels, jellies, or bars. In addition, the food composition of the present invention may have any product classification in terms of legal and functional classification as long as it conforms to the enforcement laws at the time of manufacture and distribution. For example, the product of the food composition of the present invention may include a health functional food according to the Health Functional Food Act of Korea, or confectionery, beans, tea, beverages, special purpose food, and the like, according to each food type according to the Food Ordinance of the Korea Food Sanitation Act ("Food Standards and Specifications" announced by the Ministry of Food and Drug Safety).

The food composition of the present invention may contain food additives in addition to the active ingredients thereof. Food additives can be generally understood as substances that are mixed or infiltrated with food in manufacturing, processing, or preserving food. Since food additives are consumed daily and for a long period of time with food, their safety must be ensured. Food additives with guaranteed safety are restrictively stipulated in terms of ingredients or functions in the Food Additives Ordinance in accordance with the laws of each country that regulates the manufacture and distribution of food ("Food Sanitation Act" in Korea). In the Korean Food Additives Code ("Food Additive Standards and Specifications" notified by the Ministry of Food and Drug Safety), food additives are classified into chemically synthetic products, natural additives, and mixed preparations in terms of ingredients, and these food additives are classified into a sweetener, a flavoring agent, a preservative, an emulsifier, an acidulant, a thickener, and the like, in terms of functions.

The sweetener is used to impart an appropriate sweetness to food, and natural or synthetic ones may be used. Preferably, a natural sweetener is used, and examples of the natural sweetener include sugar sweeteners, such as corn syrup solids, honey, sucrose, fructose, lactose, maltose, and so on.

The flavoring agent can be used to improve taste or aroma, and both natural and synthetic flavoring agents can be used. A natural flavoring agent is preferably used. When a natural flavoring agent is used, the purpose of nutritional enhancement in addition to flavor can be concurrently achieved. The natural flavoring agent may be obtained from apples, lemons, tangerines, grapes, strawberries, peaches, etc., or may obtained from green tea leaves, sealwort, bamboo leaves, cinnamon, chrysanthemum leaves, jasmine, etc. In addition, a natural flavoring agent may be obtained from ginseng (red ginseng), bamboo shoots, aloe vera, *Ginkgo biloba*, etc. The natural flavoring agent may be a liquid concentrate or a solid extract. In some cases, a synthetic flavoring agent may be used. As the synthetic flavoring agent, esters, alcohols, aldehydes, terpenes, etc. may be used.

As the preservative, calcium sorbate, sodium sorbate, potassium sorbate, calcium benzoate, sodium benzoate, potassium benzoate, EDTA (ethylenediaminetetraacetic acid), etc. may be used. As the emulsifier, acacia gum, carboxymethyl cellulose, xanthan gum, pectin, etc. may be used. As the acidulant, citric acid, malic acid, fumaric acid, adipic acid, phosphoric acid, gluconic acid, tartaric acid, ascorbic acid, acetic acid, etc. may be used. The acidulant may be added so that the food composition has an appropriate acidity for the purpose of inhibiting the growth of microorganisms in addition to the purpose of enhancing the taste.

As the thickener, a suspending agent, a settling agent, a gel-forming agent, a bulking agent, etc. may be used.

The food composition of the present invention may contain, in addition to the food additives described above, physiologically active substances or minerals known in the art for the purpose of supplementing and reinforcing functionality and nutrition and guaranteed stability as food additives.

Examples of such physiologically active substances may include catechins contained in green tea, etc., vitamins, such as vitamin B1, vitamin C, vitamin E, or vitamin B12, tocopherol, dibenzoylthiamine, etc. Examples of such minerals may include: calcium preparations such as calcium citrate, magnesium preparations such as magnesium stearate, iron preparations such as iron citrate, chromium chloride, potassium iodide, selenium, germanium, vanadium, zinc, and the like.

In the food composition of the present invention, the food additives as described above may be included in an appropriate amount to achieve the purpose of the addition according to the product type.

In relation to other food additives that may be included in the food composition of the present invention, reference may be made to the Food Ordinance of each country or the Food Additives Code.

The composition of the present invention may be identified as a pharmaceutical composition in another specific embodiment.

The pharmaceutical composition of the present invention may be prepared as an oral dosage form or parenteral dosage form according to the route of administration by a conventional method known in the art, including active ingredients and a pharmaceutically acceptable carrier. Here, the route of administration may be any suitable route, including topical route, oral route, intravenous route, intramuscular route, and direct absorption through mucosal tissue, and two or more routes may be used in combination. An example of a combination of two or more routes is a case in which two or more formulations of drugs according to the route of administration are combined. For example, one drug is first administered by an intravenous route and the other drug is secondarily administered by a local route.

Pharmaceutically acceptable carriers are well known in the art depending on the route of administration or formulation, and specifically, reference may be made to the pharmacopeias of each country including the "Korea Pharmacopoeia".

When the pharmaceutical composition of the present invention is prepared as an oral dosage form, the pharmaceutical composition may be prepared, together with a suitable carrier, in formulations, such as powder, granules, tablets, pills, dragees, capsules, liquids, gels, syrups, suspensions, wafers, etc. according to methods known in the art. Examples of suitable carriers include sugars, such as lactose, glucose, sucrose, dextrose, sorbitol, mannitol, or xylitol, starches, such as corn starch, potato starch, or wheat starch, celluloses, such as methylcellulose, ethylcellulose, sodium carboxymethylcellulose, or hydroxypropylmethylcellulose, polyvinylpyrrolidone, water, methylhydroxybenzoate, propylhydroxybenzoate, magnesium stearate, mineral oil, malt, gelatin, talc, polyol, vegetable oil, ethanol, glycerol, etc. In the case of formulating, an appropriate binder, lubricant, disintegrant, colorant, diluent, etc. may be included as needed. Examples of suitable binders may include starch, magnesium aluminum silicate, starch ferrist, gelatin, methylcellulose, sodium carboxymethylcellulose, polyvinylpyrrolidone, glucose, corn sweetener, sodium alginate, polyethylene glycol, wax, and the like, examples of lubricants may include sodium oleate, sodium stearate, magnesium stearate, sodium benzoate, sodium acetate, sodium chloride, silica, talcum, stearic acid, its magnesium and calcium salts, and polyethylene glycol, examples of disintegrant may include starch, methyl cellulose, agar, bentonite, xanthan gum, alginic acid or a sodium salt thereof. In addition, examples of diluents may include lactose, dextrose, sucrose, mannitol, sorbitol, cellulose, glycine, and the like.

When the pharmaceutical composition of the present invention is prepared in a formulation for parenteral use, the pharmaceutical composition may be formulated, together with a suitable carrier, in the form of injection, transdermal administration, a nasal inhalant or a suppository according to methods known in the art. When the pharmaceutical composition of the present invention is formulated for injection, an aqueous isotonic solution or suspension may be used as a suitable carrier, and specifically, phosphate buffered saline (PBS) containing triethanolamine, sterile water for injection, or an isotonic solution such as 5% dextrose may be used. When formulated for transdermal administration, the pharmaceutical composition of the present invention may be formulated in the form of ointments, creams, lotions, gels, external solutions, pasta agents, liniment agents, air rolls, and the like. In the case of a nasal inhalant, the pharmaceutical composition of the present invention may be formulated in the form of an aerosol spray using a suitable propellant such as dichlorofluoromethane, trichlorofluoromethane, dichlorotetrafluoroethane, or carbon dioxide, and when formulated as a suppository, witepsol, tween 61, polyethylene glycols, cacao fat, laurin fat, polyoxyethylene sorbitan fatty acid esters, polyoxyethylene stearate, sorbitan fatty acid esters, etc. may be used as a carrier thereof.

Specific formulations of pharmaceutical compositions are known in the art, and reference may be made to, for example, Remington's Pharmaceutical Sciences (19th ed. 1995). This document is considered a part of this specification.

A preferred dose of the pharmaceutical composition of the present invention is in the range of 0.001 mg/kg to 10 g/kg per day, preferably 0.001 mg/kg to 1 g/kg, depending on the patient's condition, weight, sex, age, severity of the patient, and the route of administration. Administration may be performed once or divided into several times a day. Such doses should not be construed as limiting the scope of the invention in any respect.

In another specific embodiment, the composition of the present invention can be identified as a cosmetic composition. When the composition of the present invention is identified as a cosmetic composition, the use thereof can be understood as a use for suppressing skin troubles, such as erythema, dryness, lichenification, erosion, dryness, or bleeding, caused by skin hypersensitivity or abnormal immunity.

Even when the composition of the present invention is identified as a cosmetic composition, the cosmetic composition can be classified into any product in terms of its use or by law, and specifically may be functional cosmetics, non-functional cosmetics, etc. having uses such as alleviation of skin troubles and alleviation of atopic dermatitis. In terms of product form, the cosmetic composition can take any product form, specifically including a solution, suspension, emulsion, paste, gel, cream, lotion, powder, soap, a surfactant-containing cleansing agent, oil, powder foundation, emulsion foundation, wax foundation, and spray. Examples of specific product forms may include formulations of a softening lotion, a nourishing lotion, a nourishing cream, a massage cream, an essence, an eye cream, a cleansing cream, a cleansing foam, a cleansing water, a pack, a spray, a powder, etc.

The cosmetic composition of the present invention may include, in addition to the active ingredient, ingredients commonly used in cosmetic compositions, for example, conventional adjuvants, such as stabilizers, solubilizers, surfactants, vitamins, pigments and fragrances, and carriers.

When the formulation of the present invention is a paste, cream or gel, animal oil, vegetable oil, wax, paraffin, starch, tragacanth, cellulose derivatives, polyethylene glycol, silicone, bentonite, silica, talc, or zinc oxide, may be used as a carrier component.

When the formulation of the present invention is a powder or a spray, lactose, talc, silica, aluminum hydroxide, calcium silicate or polyamide powder may be used as a carrier component, and specifically when the formulation of the present invention is a spray, a propellant, such as chlorofluorohydrocarbon, propane/butane or dimethyl ether, may be additionally contained.

When the formulation of the present invention is a solution or emulsion, a solvent, solubilizer or emulsifier is used as a carrier component. Specifically, water, ethanol, isopropanol, ethyl carbonate, ethyl acetate, benzyl alcohol, benzyl benzoate, propylene glycol, 1,3-butyl glycol oil, glycerol aliphatic ester, polyethylene glycol, fatty acid ester of sorbitan, etc. may be used as a carrier component.

When the formulation of the present invention is a suspension, a liquid diluent, such as water, ethanol or propylene glycol, a suspending agent, such as ethoxylated isostearyl alcohol, polyoxyethylene sorbitol ester, or polyoxyethylene sorbitan ester, microcrystalline cellulose, aluminum metahydroxide, bentonite, agar, etc. may be used as a carrier component.

When the formulation of the present invention is a surfactant-containing cleansing agent, aliphatic alcohol sulfate, aliphatic alcohol ether sulfate, sulfosuccinic acid monoester, isethionate, imidazolinium derivative, methyltaurate, sarcosinate, fatty acid amide Ether sulfate, alkylamidobetaine, fatty alcohol, fatty acid glyceride, fatty acid diethanolamide, vegetable oil, lanolin derivative, or ethoxylated glycerol fatty acid ester, etc., may be used as a carrier component.

The cosmetic composition of the present invention may be prepared according to a method for preparing a cosmetic composition conventionally performed in the art, except that an active ingredient that exhibits an atopic dermatitis alleviation activity or a skin immune hypersensitivity reaction suppression activity is included.

According to an embodiment, the composition may further include an *Artemisia annua* extract.

*Artemisia annua* has a cylindrical stem that grows above the ground, is branched from the top, and has a length of 30-80 cm and a diameter of 0.2-0.6 cm. In addition, *Artemisia annua* has a yellow-green to yellow-brown outer shell and has vertical ridges. *Artemisia annua* has a hard texture, is cut well, and has a pith in the middle of the cut surface. *Artemisia annua* has opposite leaves, dark green to greenish-brown color, and is easy to break. Intact *Artemisia annua*, when unfolded, has three upper right lobes, the lobes and small lobes thereof are round or long oval, and opposite sides thereof are covered with short hairs. *Artemisia annua* has a characteristic aroma and a slightly bitter taste. *Artemisia annua* is used as an antipyretic, hemostatic, and skin disease treatment, and the antibacterial, antiviral and antioxidant action thereof are also known. Recently, the anticancer effect thereof against breast cancer cells has been proven.

*Impatiens arguta* and *Artemisia annua* extracts are preferably mixed in a weight ratio of 1:0.05 to 2.0.

According to an embodiment, the *Impatiens arguta* extract may be used as a first raw material, and the composition may further include at least one of selected from the group consisting of *Raphanus sativus*, *Pyrus pyrifolia* and *Artemisia annua* extracts as a second raw material.

According to an embodiment, the *Raphanus sativus* extract may be prepared through a step of recovering the liquid component from the pulverized product of the *Raphanus sativus* as a *Raphanus sativus* extract.

According to an embodiment, the extracts of the first raw material and the second raw material are preferably mixed in a weight ratio of 1:0.2 to 1.5.

According to an embodiment, an extract of at least one of *Ziziphus jujuba*, *Schisandrae chinensis*, *Lycium chinense*, *Alnus japonica*, *Cuscuta semen*, and *Rhodiola rosea* is preferably further included.

More preferably, the extract is used as a lactic acid bacteria fermentation product.

The lactic acid bacteria used in the present invention may include *Lactobacillus casei*, *Lactobacillus acidophillus*, *Lactobacillus plantarum*, *Lactobacillus amylophillus*, *Lactobacillus fermentum*, *Lactobacillus curvatus*, *Lactobacillus bulgaricus*, *Lactobacillus delbrueckii* subsp. *lactis*, *Bifidobacterium breve*, *Lactobacillus gasseri*, and so on. Among others, *Lactobacillus curvatus* is preferably used, and more preferably, *Lactobacillus amylophillus*, *Bifidobacterium breve*, or a mixture of these two types may be advantageously used. As such, the lactic acid bacteria used in the present invention are all well-known and commercially available bacteria that are usually readily available, and thus there is no difficulty in obtaining the lactic acid bacteria.

According to an embodiment, the composition may further include honey.

In order to achieve another objective of the present invention, provided is a health functional food for prevention or alleviation of atopic dermatitis disease, comprising the composition according to the present invention.

According to an embodiment, the health functional food is a natural tea composition.

MODE OF DISCLOSURE

Hereinafter, the present invention will be described with reference to Examples and Experimental Examples. However, the scope of the present invention is not limited to these Examples and Experimental Examples.

Preparation Example 1: Sample Preparation

An *Impatiens arguta* extract (extraction part: leaves) was prepared, and the atopic dermatitis disease amelioration activity was confirmed. The extract was obtained in a powder form by adding 10 times the weight of 70% ethanol to dry powder of *Impatiens arguta* leaves, extracting twice at 50° C. for 6 hours, filtering, concentrating under reduced pressure and freeze-drying.

*Artemisia annua* was prepared in the same way as the *Impatiens arguta* extract and obtained in powder form.

*Raphanus sativus* and *Pyrus pyrifolia* extracts were filtered through a 3M filter pulverized with a blender, and liquid extracts and solid components were separated. The liquid component was autoclaved at 120° C. at 1.5 atm for 15 minutes, cooled at room temperature, titrated to pH 6.2-6.6, and stored at 4° C.

Extracts of *Ziziphus jujuba*, *Schisandrae chinensis*, *Lycium chinense*, *Alnus japonica*, *Cuscuta semen*, and *Rhodiola rosea* were obtained in the same manner as the *Impatiens arguta* leaves to obtain powders, respectively.

For honey, commercially available natural honey from Mt. Jiri (Mohyanggol Farm in Mt. Jiri) was used.

EXAMPLES

By using the extracts, compositions were obtained as shown in Table 1 below.

TABLE 1

(Unit: wt %)

| Ingredient | Example 1 | Example 2 | Example 3 | Comparative Example 1 | Comparative Example 2 |
|---|---|---|---|---|---|
| Impatiens arguta | 90 | 45 | 40 | | |
| Artemisia annua | | 45 | 25 | 45 | 90 |
| Raphanus sativus | | | 25 | 45 | |
| Ziziphus jujuba | 5 | 5 | 5 | 5 | 5 |
| Schisandrae chinensis | 3 | 3 | 3 | 3 | 3 |
| Honey | 2 | 2 | 2 | 2 | 2 |
| Total | 100 | 100 | 100 | 100 | 100 |

<Preparation Example> Manufacture of Atopic Dermatitis Animal Model

In order to confirm in the animal model whether it is effective on atopic dermatitis, an animal model in which atopic dermatitis is induced was manufactured. Specifically, the hair of the back area of each of 5 to 6-week-old Nc/Nga mice (Japanese fancy mice, Nishiki-Nezumi, Japan) was cleanly removed and left for 24 hours to heal the microscopic wounds on the skin after hair removal was completed, followed by applying 200 ul of 1% DNCB solution (acetone: olive oil=3:1) to the back area, thereby causing dermatitis. After 4 days, 150 ul of 0.2% DNCB solution was applied 2~3 times a week to the back area for a period of 4 to 5 weeks to sufficiently induce dermatitis and to peel off all the crusts on the back area, facilitating the penetration of a therapeutic drug, and, when scratching intensified with the formation of new dermatitis, DNCB treatment was stopped. As such, an atopic dermatitis animal model was manufactured.

<Experimental Example 1> Anti-atopic Effect of Extract in Atopic Animal Model

<1> Sensory Evaluation

In order to confirm the anti-atopic effect of the compositions of Examples and Comparative Examples in atopic animal models, the extract was treated in an atopic dermatitis induced animal model, and sensory evaluation was performed by using a clinical visual evaluation method.

Specifically, in the animal model of Preparation Example 1 in which atopic dermatitis was induced, 10 days after the treatment with the compositions of Examples and Comparative Examples was completed, 30% 1,3-butylene glycol was applied to a control group, 200 ul of each of the compositions of Examples and Comparative Examples was applied to the experimental group twice a day for a period of 8 weeks, and then sensory evaluation was performed by using a clinical visual evaluation method at intervals of 2 weeks. The visual evaluation result was expressed as the total of the scores respectively evaluated for five evaluation items, which are erythema, pruritus & dry skin, edema & escoriation, erosion, and lichenification. These evaluation items were scored as none (0), mild (1), severe (2), and extreme (3), and the scores ranged from a minimum of 0 to a maximum of 15. In general, when the dermatitis is induced by using DNCB, it can be determined that the dermatitis has reached its peak at about 12 to 13 points.

As a result, compared to an untreated group and the control group treated only with butylene glycol or the compositions of Comparative Examples, all of the compositions of Examples according to the present invention showed a tendency to improve an atopic condition. Therefore, it was confirmed that the composition according to the present invention exhibited a remarkable effect in alleviating the symptoms in an atopic animal model.

<Preparation Example 1> Preparation of Pharmaceutical Preparations

| <1-1> Preparation of Powders | |
|---|---|
| Composition of Example 1 | 20 mg |
| Lactose | 20 mg |

After mixing the above ingredients, the powder was prepared by filling the mixture in an airtight cloth.

| <1-2> Preparation of Tablets | |
|---|---|
| Composition of Example 1 | 10 mg |
| Corn starch | 100 mg |
| Lactose | 100 mg |
| Magnesium stearate | 2 mg |

After mixing the above ingredients, tablets were prepared by tableting according to a conventional tablet manufacturing method.

<Preparation Example 2> Preparation of Foods

Foods containing the composition of Example 1 of the present invention were prepared as follows.

| <Preparation of health drinks> | |
|---|---|
| Composition of Example 1 | 100 mg |
| Citric acid | 100 mg |
| Oligosaccharide | 100 mg |
| Plum concentrate | 2 mg |
| Taurine | 100 mg |
| Purified water added | Total 500 ml |

After mixing the above ingredients according to a conventional health drink manufacturing method, the mixture was stirred and heated at 85° C. for about 1 hour, and the resulting solution was filtered and obtained in a sterilized 1 L container, followed by sealing and sterilizing, and then storing in a refrigerator, to then be used for manufacturing the health beverage composition of the present invention.

The composition ratio was prepared by mixing ingredients suitable for relatively favorite beverages in a preferred embodiment, but the mixing ratio may be arbitrarily modified according to regional and national preferences, such as demand class, demand country, and purpose of use.

<Preparation Example 3> Preparation of Cosmetics

<Softening (Skin) Lotion>

In order to prepare a softening lotion for atopic skin, containing the composition of Example 1 of the present invention, the softening lotion may be prepared according to the manufacturing method in the conventional cosmetic field by mixing in the following manner.

| | |
|---|---|
| Composition of Example 1 | 20 wt % |
| 1,3-butylene glycol | 3.0 wt % |
| Glycerin | 5.0 wt % |
| Polyoxyethylene (60) hydrogenated castor oil | 0.2 wt % |
| Ethanol | 8.0 wt % |
| Citric acid | 0.02 wt % |
| Sodium citrate | 0.06 wt % |
| Preservative | trace amount |
| Perfume | trace amount |
| Purified water | To 100 |

What is claimed is:

1. A composition for alleviation of atopic dermatitis, comprising an *Impatiens arguta* extract, an *Artemisia annua* extract, and *Raphanus sativus* extract as active ingredients,
   wherein a content percentage by weight of the *Impatiens arguta* extract is 40 wt %,
   wherein a content percentage by weight of the *Artemisia annua* extract is 25 wt %, and
   wherein a content percentage by weight of the *Raphanus sativus* extract is 25 wt %.

2. The composition of claim 1, wherein the *Impatiens arguta* extract, the *Artemisia annua* extract, and the *Raphanus sativus* extract are extracts obtained by water, ethanol, or a mixed solvent thereof.

3. The composition of claim 1, further comprising an extract of at least one of *Ziziphus jujuba, Schisandrae chinensis, Lycium chinense, Alnus japonica, Cuscuta semen*, and *Rhodiola rosea*.

4. The composition of claim 1, further comprising honey.

5. A health functional food for alleviation of atopic dermatitis, comprising the composition according to claim 1.

6. The health functional food of claim 5, wherein the health functional food is a tea composition.

7. A pharmaceutical composition for the alleviation or treatment of atopic dermatitis, comprising the composition according to claim 1.

8. A cosmetic composition for the alleviation of atopic dermatitis, comprising the composition according to claim 1.

9. A health functional food for alleviation of atopic dermatitis, comprising the composition according to claim 2.

10. A pharmaceutical composition for the alleviation or treatment of atopic dermatitis, comprising the composition according to claim 2.

11. A cosmetic composition for the alleviation of atopic dermatitis, comprising the composition according to claim 2.

* * * * *